United States Patent
Yoshida et al.

(10) Patent No.: US 8,623,477 B2
(45) Date of Patent: Jan. 7, 2014

(54) PHOTOVOLTAIC POLARIZING ELEMENT AND METHOD OF MANUFACTURING THE SAME

(75) Inventors: Mamoru Yoshida, Kunitachi (JP); Tetsushi Yoshida, Tsukui-gun (JP)

(73) Assignee: Casio Computer Co., Ltd., Tokyo (JP)

(*) Notice: Subject to any disclaimer, the term of this patent is extended or adjusted under 35 U.S.C. 154(b) by 353 days.

(21) Appl. No.: 12/897,013

(22) Filed: Oct. 4, 2010

(65) Prior Publication Data
US 2011/0096271 A1    Apr. 28, 2011

(30) Foreign Application Priority Data
Oct. 22, 2009   (JP) .................................. 2009-243670

(51) Int. Cl.
*G02F 1/1335*   (2006.01)
*H01L 31/04*    (2006.01)

(52) U.S. Cl.
USPC ......................................... 428/1.31; 136/257

(58) Field of Classification Search
USPC .............. 428/1.31, 1.4; 349/96; 136/254–257
See application file for complete search history.

(56) References Cited

U.S. PATENT DOCUMENTS

| | | | |
|---|---|---|---|
| 7,179,988 B2* | 2/2007 | Spivack et al. ................. | 136/263 |
| 2004/0084080 A1* | 5/2004 | Sager et al. .................... | 136/263 |
| 2007/0248760 A1* | 10/2007 | Chmelka et al. ............... | 427/402 |
| 2008/0000520 A1* | 1/2008 | Uchida et al. .................. | 136/252 |
| 2008/0163923 A1* | 7/2008 | Park et al. ...................... | 136/248 |
| 2009/0173380 A1* | 7/2009 | Shin et al. ...................... | 136/256 |
| 2009/0173920 A1* | 7/2009 | Kang et al. ..................... | 252/514 |
| 2009/0314339 A1* | 12/2009 | Hayase et al. ................. | 136/256 |

FOREIGN PATENT DOCUMENTS

| | | |
|---|---|---|
| JP | 2002-296590 A | 10/2002 |
| JP | 2006-332469 A | 12/2006 |
| JP | 2007-113365 A | 5/2007 |
| JP | 2008-41258 A | 2/2008 |
| JP | 2009-087894 A | 4/2009 |

OTHER PUBLICATIONS

JPO Website Machine English Translation of JP 2002-296590, Hayase Shuji et al., Oct. 9, 2002.*

* cited by examiner

*Primary Examiner* — Sophie Hon
(74) *Attorney, Agent, or Firm* — Holtz, Holtz, Goodman & Chick, PC

(57) ABSTRACT

A photovoltaic light-polarizing element includes a first transparent electrode, an alignment film, an electron collector, dichroic dye molecules, a second transparent electrode and an electron supplier. The first transparent electrode is formed on a first transparent substrate. The alignment film is formed on the first transparent electrode and is alignment-processed in a first direction. The electron collector is formed on the alignment film as a porous layer having pores aligned in a second direction orthogonal to the first direction. The second transparent electrode is formed on a second transparent substrate, the second transparent electrode facing the first transparent electrode with a predetermined gap. The electron supplier is arranged in the gap between the first transparent electrode and the second transparent electrode. And the dichroic dye molecules are arranged in the pores of the porous layer such that the dichroic dye molecules are aligned in the second direction.

9 Claims, 4 Drawing Sheets

PHOTOVOLTAIC POLARIZING ELEMENT AND METHOD OF MANUFACTURING THE SAME

CROSS-REFERENCE TO RELATED APPLICATIONS

This application is based upon and claims the benefit of priority from prior Japanese Patent Application No. 2009-243670, filed Oct. 22, 2009, the entire contents of which are incorporated herein by reference.

BACKGROUND OF THE INVENTION

1. Field of the Invention

The present invention relates to a photovoltaic light-polarizing element and a method of manufacturing the same.

2. Description of the Related Art

Generally, a polarizing plate passes only polarized light in a specific plane of oscillation. At this time, light components that have not passed through the polarizing plate are absorbed, and most of the luminous energy is dissipated as thermal energy.

As an example, energy consumption of a liquid crystal display will be explained. A liquid crystal display includes a liquid crystal panel formed by sandwiching a liquid crystal layer between two polarizing plates. The liquid crystal display displays an image by controlling the amount of, out of light emitted by a backlight serving as a light source, light components that pass through the two polarizing plates. When such a liquid crystal display is displaying white, the ratio of light passing through the liquid crystal panel to light emitted by the backlight is about 5%. In this case, the backlight-side polarizing plate absorbs most of the light emitted by the backlight. The backlight-side polarizing plate absorbs about 55% to 60% of the light emitted by the backlight. Most of the absorbed luminous energy is dissipated as heat. In addition, most of power to be consumed by the whole liquid crystal display is consumed by the backlight. The larger the screen size is, the stronger the tendency is. Under these circumstances, a polarizing plate with little energy loss is demanded.

In recent years, a dye-sensitized solar cell as disclosed in Jpn. Pat. Appln. KOKAI Publication No. 2008-41258 is expected to be put into practical use because it enables to manufacture a large-area element at a low cost and realize a flexible cell, as compared to a solar cell using silicon crystal. The principle of power generation of the dye-sensitized solar cell will briefly be described below. Dye molecules are excited upon absorbing light, and the electrons of the dye molecules are injected into titanium oxide that is a semiconductor. The dye molecules that have lost electrons obtain electrons from an electrolyte. Hence, a voltage difference is generated between the titanium oxide and the electrolyte. This voltage difference functions as a cell.

As described above, a polarizing plate with little energy loss is demanded. In a dye-sensitized solar cell as disclosed in Jpn. Pat. Appln. KOKAI Publication No. 2008-41258, dye molecules are isotropic with respect to light because they are given no specific direction of alignment. When dichroic molecules given a specific direction of alignment are used as the dye molecules, the dye-sensitized solar cell is expected to function as a polarizing element.

BRIEF SUMMARY OF THE INVENTION

According to an aspect of the invention, a photovoltaic light-polarizing element includes a first transparent electrode formed on a first transparent substrate; an alignment film formed on the first transparent electrode and alignment-processed in a first direction; an electron collector formed on the alignment film; dichroic dye molecules arranged in the electron collector, a second transparent electrode formed on a second transparent substrate, the second transparent electrode facing the first transparent electrode with a predetermined gap therebetween, the electron collector being interposed between the first transparent electrode and the second transparent electrode; and an electron supplier arranged in the gap between the first transparent electrode and the second transparent electrode; wherein the electron collector is formed as a porous layer having pores aligned in a second direction orthogonal to the first direction; wherein each of the dichroic dye molecules has a rod molecular structure, and an absorption coefficient of the dichroic dye molecules changes depending on a plane of oscillation of incident polarized light; and wherein the dichroic dye molecules are arranged in the pores of the porous layer such that the dichroic dye molecules are aligned in the second direction.

According to an aspect of the invention, a method of manufacturing a photovoltaic light-polarizing element, the method includes forming a polymer thin film on a first transparent electrode formed on a first transparent substrate; performing an alignment treatment for the polymer thin film; applying a solution of a surfactant containing a metal to the polymer thin film that has undergone the alignment treatment; baking the first transparent substrate with the applied solution of the surfactant so as to form, on the polymer thin film, a porous layer made of the metal, the porous layer having cylindrical pores which are aligned in a predetermined direction, and to remove the surfactant; introducing dichroic dye molecules into the cylindrical pores so as to be aligned in the predetermined direction; bonding the first transparent electrode on which the dichroic dye molecules are introduced into the cylindrical pores and a second transparent electrode formed on a second transparent substrate so that the porous layer and the second transparent electrode face each other and have a gap of a predetermined distance; and sealing an electron supplier in the gap.

According to an aspect of the invention, a liquid crystal display includes the photovoltaic light-polarizing element to be used as a polarizing plate, wherein power generated by the photovoltaic light-polarizing element is used for an operation of the liquid crystal display.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
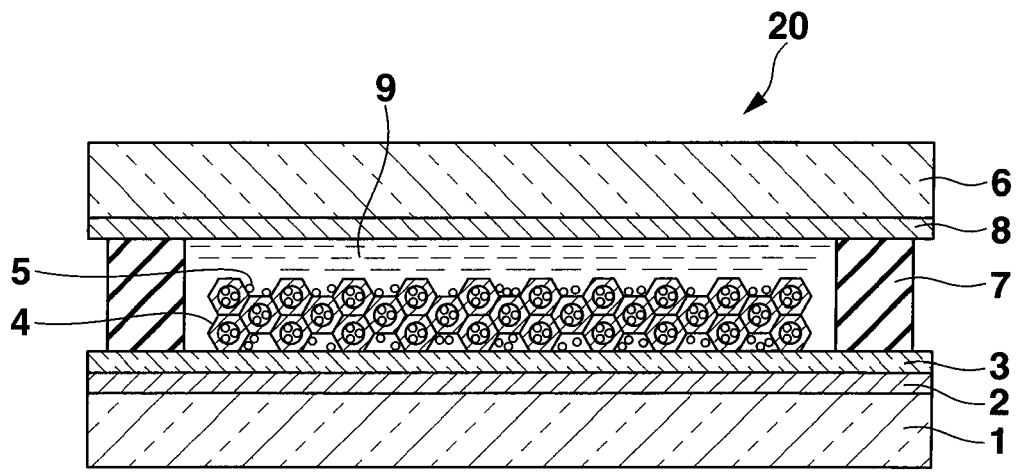
FIG. 1 is a sectional view showing an arrangement example of a photovoltaic light-polarizing element according to an embodiment of the present invention.
Figure 2:
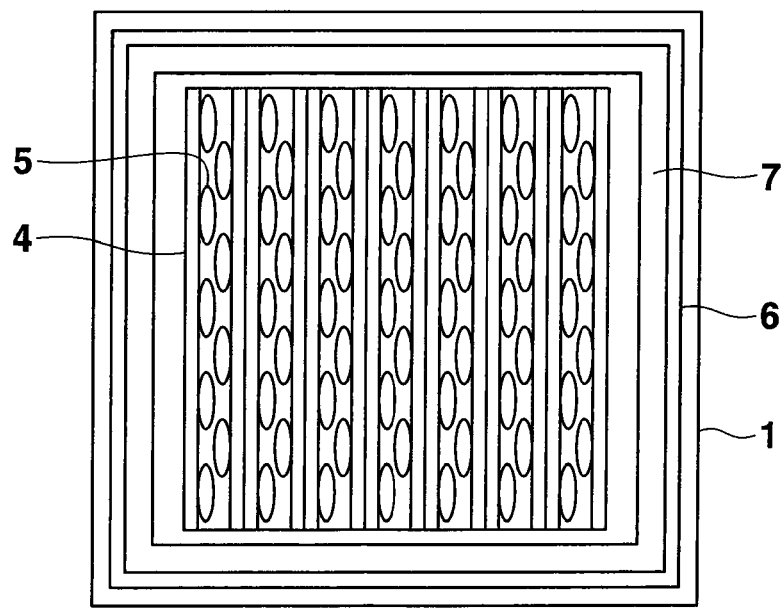
FIG. 2 is a planar view showing the arrangement example of the photovoltaic light-polarizing element according to the embodiment of the present invention.

An embodiment of the present invention will now be described with reference to the accompanying drawings. FIGS. 1 and 2 illustrate a schematic structure of a photovoltaic light-polarizing element according to this embodiment. As shown in FIGS. 1 and 2, a first transparent conductive film 2 is formed on a first transparent substrate 1. The first transparent substrate 1 may include, for example, glass or a heat-resistant resin. The first transparent conductive film 2 may include, for example, indium tin oxide (ITO) or tin oxide ($SnO_2$). An alignment film 3 made of a polymeric thin film of, for example, polyimide is formed on the surface of the first transparent conductive film 2. A porous layer 4 having cylindrical pores which are aligned in a predetermined direction is formed on the alignment film 3. As the material of the porous layer 4, an oxide semiconductor is preferably used. Out of the oxide semiconductors, particularly, titanium oxide, zinc oxide, tin oxide, tungsten oxide, niobium oxide, indium oxide, or a complex thereof generally used in a dye-sensitized solar cell is usable. Especially, titanium oxide ($TiO_2$) that is an excellent material for a dye-sensitized solar cell is preferably used.

The pores of the porous layer 4 are filled with a dichroic dye 5 in accordance with the direction of pores. As the dichroic dye 5, for example, Congo red (sodium 3,3'-(1E,1'E)-biphenyl-4,4'-diylbis(diazene-2,1-diyl)bis(4-aminonaphthalene-1-sulfonate)) that is an azo dye is usable.

A second transparent substrate 6 is bonded to the first transparent substrate 1 via a sealing material 7 so that the second and first transparent substrates face each other and maintain a small gap between them. A second transparent conductive film 8 is formed on a surface of the second transparent substrate 6 facing the first transparent substrate 1. The second transparent substrate 6 may include, for example, glass or a heat-resistant resin. The second transparent conductive film 8 may include, for example, indium tin oxide (ITO) or tin oxide ($SnO_2$). An electrolyte 9 is sealed in the gap between the first transparent substrate 1 and the second transparent substrate 6 surrounded by the sealing material 7. As the solvent of the electrolyte 9, for example, acetonitrile, methoxyacetonitrile, or ethylene carbonate is usable. As the solute of the electrolyte 9, for example, 1,2-dimethyl-3-propylimidazolium iodide (DMPImI), lithium iodide (LiI), iodine ($I_2$), or 4-tert-butylpyridine (TBP) is usable.

Figure 3:
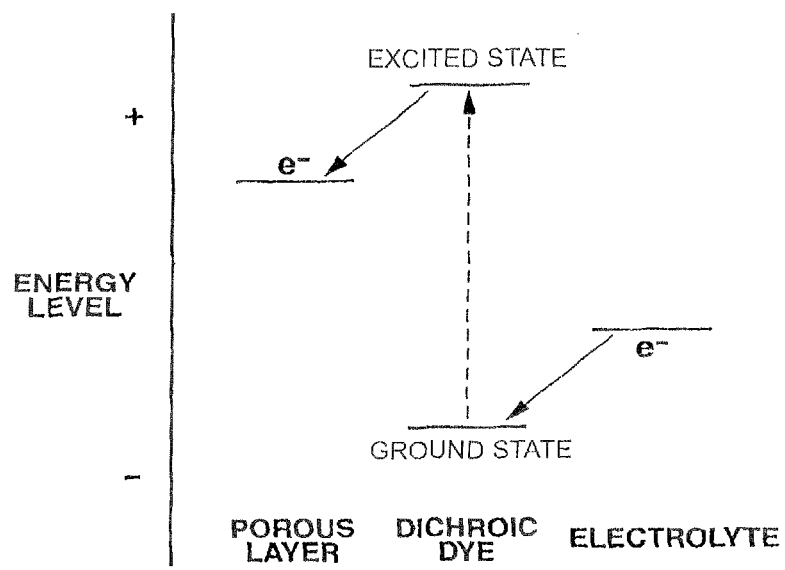
FIG. 3 is an energy diagram for explaining the principle of power generation of the photovoltaic light-polarizing element according to the embodiment of the present invention.

The principle of power generation of the photovoltaic light-polarizing element according to this embodiment will be described next with reference to FIG. 3. First, when the photovoltaic light-polarizing element is exposed to light, the dichroic dye 5 absorbs the light. The light absorbed by the dichroic dye 5 excites the dichroic dye 5 (dashed arrow in FIG. 3). The electrons of the excited dichroic dye 5 are transferred to the porous layer 4 made of, for example, titanium oxide that is a wide-gap semiconductor. The electrons received by the porous layer 4 move to the first transparent conductive film 2. In contrast, the dichroic dye 5 that has lost the electrons receives electrons from, for example, $I^-$ of the electrolyte 9 in contact with the second transparent conductive film 8. $3I^-$ changes to $I_3^-$ by supplying electrons. Hence, for example, $I_3^-$ of the electrolyte 9 will receive electrons from the second transparent conductive film 8. That is, a voltage difference is generated between the first transparent conductive film 2 and the second transparent conductive film 8. When an external circuit is connected between the first transparent conductive film 2 and the second transparent conductive film 8, the electrons that have moved to the first transparent conductive film 2 then move to the second transparent conductive film 8 via the external circuit. The electrons move to, for example, $I_3^-$ of the electrolyte 9, and $I_3^-$ changes to $3I^-$. The dichroic dye 5 that has lost the electrons receives electrons from, for example, $I^-$ of the electrolyte 9. In this way, the external circuit connected to the first transparent conductive film 2 and the second transparent conductive film 8 can extract a current from the photovoltaic light-polarizing element of the embodiment that has absorbed the light. As mentioned above, the photovoltaic light-polarizing element functions as a cell.

The photovoltaic light-polarizing element generates power based on the above-described principle. Hence, the energy level of the dichroic dye 5 in the excited state is higher than that of the porous layer 4. The energy level of the dichroic dye 5 in the ground state is lower than that of the electrolyte 9.

The dichroic dye 5 has a rod molecular structure, and changes its absorption coefficient depending on the plane of oscillation of incident polarized light. That is, the dichroic dye 5 has a transition moment in the molecules, and absorbs light having a plane of oscillation parallel to the direction of the transition moment but not light having a perpendicular plane of oscillation. The dichroic dye 5 adsorbed on the inner surfaces of the pores of the porous layer 4 is aligned in accordance with the unidirectional property of the pores, and therefore optically exhibits anisotropy. Hence, when unpolarized light enters the photovoltaic light-polarizing element, linearly polarized light whose electrical plane of oscillation matches the direction of alignment of the dichroic dye 5 is absorbed. The energy of the absorbed light is used for the above-described power generation. In contrast, linearly polarized light whose electrical plane of oscillation is perpendicular to the direction of alignment of the dichroic dye 5 passes through the photovoltaic light-polarizing element. The photovoltaic light-polarizing element functions as a light-polarizing plate in this way.

As described above, for example, the first transparent conductive film 2 may function as a first transparent electrode formed on the first transparent substrate. For example, the porous layer 4 may function as an electron collector formed on the first transparent electrode. For example, the dichroic dye 5 may function as dichroic dye molecules arranged on the electron collector. For example, the second transparent conductive film 8 may function as a second transparent electrode formed on the second transparent substrate. For example, the electrolyte 9 may function as an electron supplier arranged in the space between the first transparent electrode and the second transparent electrode.

A method of manufacturing the photovoltaic light-polarizing element according to the embodiment will be described next with reference to FIG. 4. First, the first transparent conductive film 2 such as an indium tin oxide (ITO) film is formed on the first transparent substrate 1 made of, for example, glass. A polymeric thin film 3' of, e.g., polyimide is formed on the first transparent conductive film 2 (first line of FIG. 4). A rubbing roller 10 with a rubbing cloth 11 wound on it is rolled on the surface of the formed polymeric thin film 3' so as to perform a rubbing process, thereby changing the polymeric thin film 3' to the alignment film 3 (second line of FIG. 4). The direction of rubbing is perpendicular to the direction of alignment of cylindrical pores of mesoporous titanium oxide to be formed next.

Figure 4:
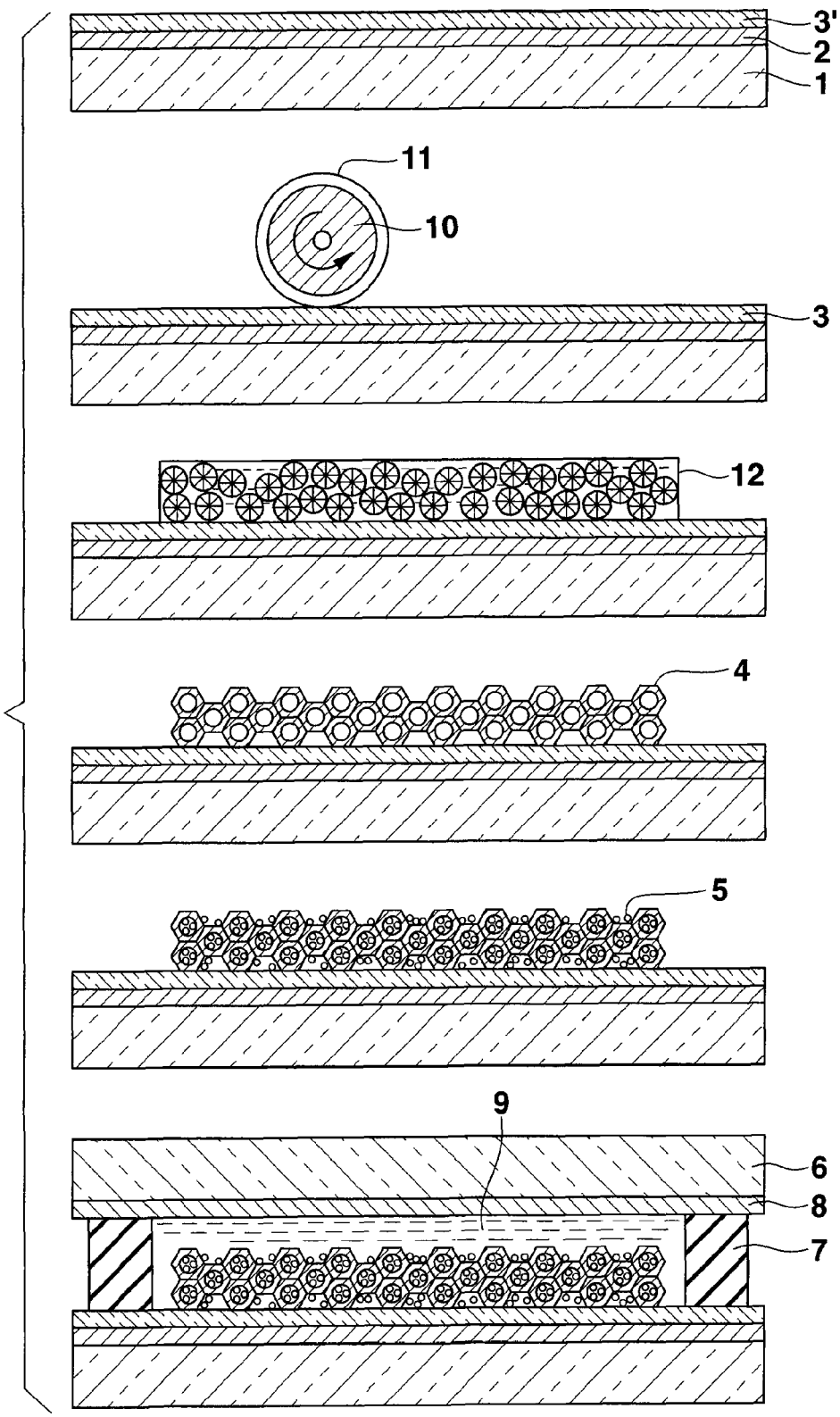
FIG. 4 shows sectional views showing an example of a method of manufacturing the photovoltaic light-polarizing element according to the embodiment of the present invention.

A solution 12 of a surfactant for forming cylindrical micelle and, for example, a titanium oxide precursor is applied to the substrate (third line of FIG. 4). Next, the substrate is baked to obtain the porous layer 4 having cylindrical pores aligned in a predetermined direction (fourth line of FIG. 4). For example, when $TiOSO_4$ is used as the titanium oxide precursor, a mesoporous titanium oxide thin film may be formed. As the surfactant for forming cylindrical micelle, for example, cetyltrimethylammonium chloride that is a cationic surfactant, or polyoxyethylene (10) lauryl ether or polyoxyethylene (10) cetyl ether that is a nonionic surfactant is usable. Note that the surfactant is removed by baking.

Then, the substrate with the porous layer 4 is dipped in the solution of the dichroic dye 5 to adsorb the dichroic dye 5. After adsorbing the dichroic dye 5, the substrate is removed from the solution of the dichroic dye 5, cleaned to remove the excess dye, and dried (fifth line of FIG. 4).

The second transparent substrate 6 is separately prepared, which is made of, for example, glass and has the second transparent conductive film 8 such as an indium tin oxide (ITO) film formed on it. The second transparent substrate 6 is bonded, via the sealing material 7, to the first transparent substrate 1 with the mesoporous titanium oxide thin film including pores filled with the dichroic dye 5 so that a small gap is maintained between the substrates. Finally, the electrolyte 9 is vacuum-injected from, for example, an inlet provided in the sealing material 7 in advance into the gap between the first transparent substrate 1 and the second transparent substrate 6. The electrolyte 9 is sealed by a sealing compound (sixth line of FIG. 4).

Note that the electrolyte 9 has been explained above as a liquid. However, to prevent possible leakage of the electrolyte 9, not the electrolyte 9 but a p-type wide-gap semiconductor capable of passing visible light may be formed on the porous layer 4 that has adsorbed the dichroic dye 5, and the second transparent substrate 6 with the second transparent conductive film 8 may be bonded to it. Alternatively, a p-type wide-gap semiconductor capable of passing visible light may be formed on the second transparent conductive film 8 formed on the second transparent substrate 6, and bonded to the porous layer 4 that has adsorbed the dichroic dye 5. The electrolyte 9 acts to supply electrons the dichroic dye 5 has lost upon photoexcitation. This amounts to transporting holes generated upon exciting the dichroic dye 5 to the counterelectrode. Hence, the p-type wide-gap semiconductor capable of passing visible light can act like the electrolyte 9.

A conventional light-polarizing plate passes, out of light input from an unpolarized light source, a linearly polarized light component, and therefore dissipates most of the incident light as thermal energy. In contrast, the photovoltaic light-polarizing element according to this embodiment functions as a cell that extracts, as electrical energy, the energy conventionally dissipated as thermal energy and wasted, and also functions as a light-polarizing plate that passes linearly polarized light. Therefore, the photovoltaic light-polarizing element may be regarded as a light-polarizing plate with little energy loss.

Note that the porous layer 4 made of, for example, mesoporous titanium oxide and used in the photovoltaic light-polarizing element according to this embodiment acts to align the dichroic dye so as to make the photovoltaic light-polarizing element function as a light-polarizing plate. In addition, the porous layer 4 having a large surface area acts to increase the amount of fixed dichroic dye and raise the power generation efficiency.

Figure 5:
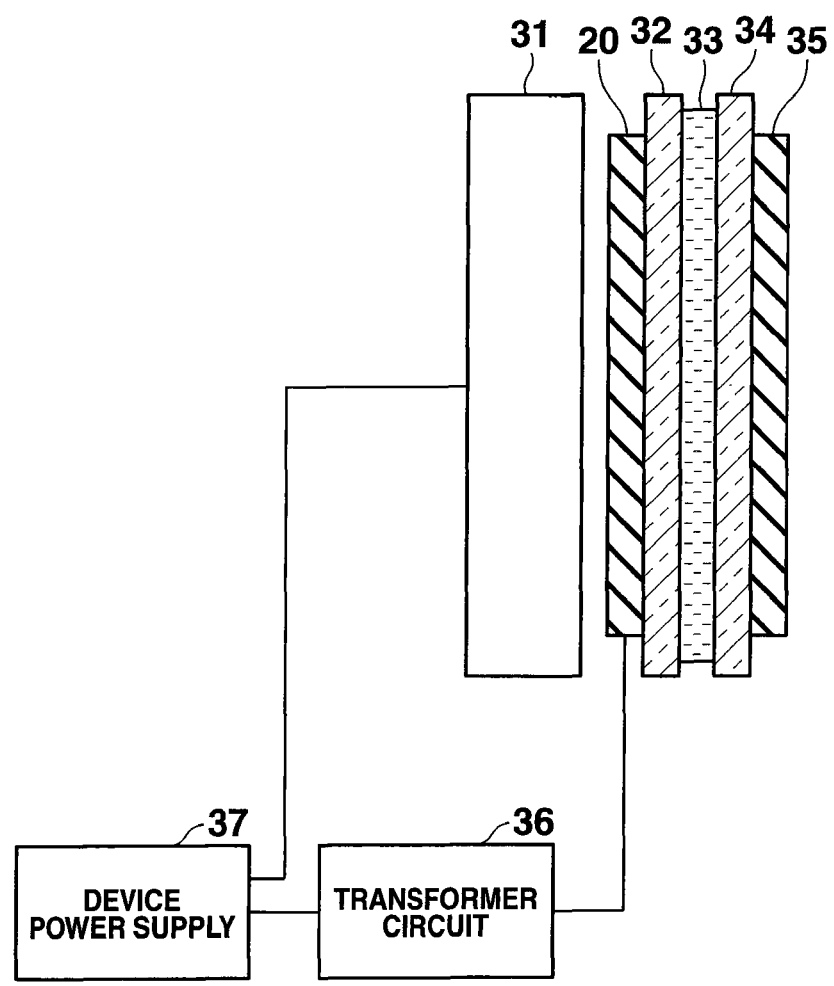
FIG. 5 is a view showing a schematic arrangement example of a liquid crystal display using the photovoltaic light-polarizing element according to the embodiment of the present invention.

A liquid crystal display using the photovoltaic light-polarizing element according to the embodiment will be described next with reference to FIG. 5. As shown in FIG. 5 that illustrates a schematic structure, the liquid crystal display uses a photovoltaic light-polarizing element 20 as the backlight-side light-polarizing plate. The remaining components are the same as in a general liquid crystal display. More specifically, the liquid crystal display includes a backlight 31 serving as a light source, the photovoltaic light-polarizing element 20 according to the embodiment, a TFT substrate 32, a liquid crystal layer 33, a CF substrate 34, and a light-polarizing plate 35, which are stacked in this order. The TFT substrate 32 includes pixel electrodes, and thin-film transistors (TFTs) for controlling drive of the pixel electrodes. The liquid crystal layer 33 rotates the plane of oscillation of polarized light that has passed through the photovoltaic light-polarizing element 20. The CF substrate 34 includes a transparent electrode serving as an opposed electrode, and color filters (CF) for colorizing image display. The photovoltaic light-polarizing element 20 is connected to a transformer circuit 36. The transformer circuit 36 is connected to a device power supply 37. The device power supply 37 is connected to the backlight 31, a TFT driver (not shown), and the like to supply power necessary for the operation of the liquid crystal display.

The backlight 31 functions as a light source. Light emitted by the backlight 31 enters the photovoltaic light-polarizing element 20. Out of the light incident on the photovoltaic light-polarizing element 20, linearly polarized light whose electrical plane of oscillation matches the direction of alignment of the dichroic dye is absorbed. The energy of the absorbed light is used for power generation, as described above. The transformer circuit 36 converts the voltage of the generated power, and sends it to the device power supply 37. In contrast, linearly polarized light whose electrical plane of oscillation is perpendicular to the direction of alignment of the dichroic dye passes through the photovoltaic light-polarizing element 20.

The TFT substrate 32 includes transparent pixel electrodes that form the pixels of the liquid crystal display, and TFTs serving as the switching elements of the pixel electrodes. The TFTs on the TFT substrate 32 are used to control the electrical fields between the pixel electrodes on the TFT substrate 32 and the opposed electrode on the CF substrate 34. The orientation of liquid crystal molecules in the liquid crystal layer 33 is controlled by the electrical field control. Rotation of the plane of oscillation of polarized light that has passed through the photovoltaic light-polarizing element 20 is controlled by controlling the orientation of liquid crystal molecules. The color filters on the CF substrate 34 colorize the passing light. With this structure, the amount of, out of light emitted by the backlight 31 and colorized by the color filters, light components that pass through the light-polarizing plate 35 is controlled, thereby causing the liquid crystal display to display a color image.

In a conventional liquid crystal display using a light-polarizing plate, about 55% to 60% of light emitted by the backlight is absorbed by the light-polarizing plate and dissipated as thermal energy. In the liquid crystal display of the embodiment, however, out of the light emitted by the backlight, luminous energy absorbed by the photovoltaic light-polarizing element 20 on the backlight side is partially returned to the device power supply 37 again as electrical energy. This allows power saving in the whole liquid crystal display.

An example has been described above in which the photovoltaic light-polarizing element is used in a liquid crystal display. However, the photovoltaic light-polarizing element may be used in various kinds of display apparatuses using a light-polarizing plate such as a plasma display and an organic electroluminescent display. Using the photovoltaic light-polarizing element enables power saving in the various kinds of display apparatuses. Not only a display apparatus but also various kinds of apparatuses using a light-polarizing plate can obtain the same effects as described above by using the photovoltaic light-polarizing element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photovoltaic light-polarizing element comprising:
   a first transparent electrode formed on a first transparent substrate;
   an alignment film formed on the first transparent electrode and alignment-processed in a first direction;
   an electron collector formed on the alignment film;
   dichroic dye molecules arranged in the electron collector;
   a second transparent electrode formed on a second transparent substrate, the second transparent electrode facing the first transparent electrode with a predetermined gap therebetween, the electron collector being interposed between the first transparent electrode and the second transparent electrode; and
   an electron supplier arranged in the gap between the first transparent electrode and the second transparent electrode;
   wherein the electron collector is formed as a porous layer having pores aligned in a second direction orthogonal to the first direction;
   wherein each of the dichroic dye molecules has a rod molecular structure, and an absorption coefficient of the dichroic dye molecules changes depending on a plane of oscillation of incident polarized light; and
   wherein the dichroic dye molecules are arranged in the pores of the porous layer such that the dichroic dye molecules are aligned in the second direction.

2. The element according to claim 1, wherein a diameter of the pores of the electron collector is larger than a diameter of the dichroic dye molecules, and the electron collector comprises mesoporous titanium oxide.

3. The element according to claim 1, wherein the dichroic dye molecules comprise azo dye molecules.

4. The element according to claim 1, wherein the electron supplier comprises a solution of iodine.

5. A liquid crystal display comprising:
   the photovoltaic light-polarizing element of claim 1, which is used as a polarizing plate,
   wherein power generated by the photovoltaic light-polarizing element is used for an operation of the liquid crystal display.

6. The display according to claim 5, wherein the photovoltaic light-polarizing element is used as a backlight-side polarizing plate and is connected to a power supply of the liquid crystal display via a transformer circuit.

7. The element according to claim 1, wherein the alignment film comprises a polyimide thin film.

8. The element according to claim 1, wherein the alignment process comprises a rubbing process.

9. The element according to claim 1, wherein an energy level of the dichroic dye molecules in an excited state is higher than an energy level of the electron collector, and an energy level of the dichroic dye molecules in a ground state is lower than an energy level of the electron supplier.

* * * * *